(12) United States Patent
Bich et al.

(10) Patent No.: US 8,011,272 B1
(45) Date of Patent: Sep. 6, 2011

(54) DUAL FLYWHEEL AXIALLY COMPACT EPICYCLICAL DRIVE

(75) Inventors: Gary L. Bich, New Holland, PA (US); Beau Carlson, Ephrata, PA (US); David M. DeChristopher, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/768,952

(22) Filed: Apr. 28, 2010

(51) Int. Cl.
   *F16C 3/04* (2006.01)
(52) U.S. Cl. .......................................... 74/595; 56/299
(58) Field of Classification Search .............. 74/595, 74/84 R, 568 R, 567, 569, 55; 56/259, 257, 56/158, 17.6, 260, 299
   See application file for complete search history.

(56) References Cited

U.S. PATENT DOCUMENTS

| | | | |
|---|---|---|---|
| 671,024 A * | 4/1901 | Long ................................ | 56/297 |
| 738,033 A * | 9/1903 | Haynes ............................ | 56/297 |
| 1,897,924 A | 2/1933 | Coleman et al. | |
| 2,745,238 A | 5/1956 | Hopkins | |
| 2,787,111 A * | 4/1957 | Templeton ...................... | 56/297 |
| 2,808,696 A | 10/1957 | Hall | |
| 3,246,461 A * | 4/1966 | Wood .............................. | 56/297 |
| 3,517,494 A | 6/1970 | Beusink et al. | |
| 3,577,716 A * | 5/1971 | McCarty et al. ................. | 56/259 |
| 3,657,868 A * | 4/1972 | Cousino .......................... | 56/13.6 |
| 3,897,630 A | 8/1975 | Glover et al. | |
| 3,941,003 A * | 3/1976 | Garrison et al. .................. | 74/44 |
| 3,973,378 A * | 8/1976 | Bartasevich et al. ........... | 56/11.9 |
| 4,023,334 A | 5/1977 | Heath | |
| 4,067,179 A * | 1/1978 | Schneider ....................... | 56/297 |
| 4,813,296 A * | 3/1989 | Guinn .............................. | 74/595 |
| 4,815,265 A * | 3/1989 | Guinn et al. ..................... | 56/297 |
| 4,866,921 A * | 9/1989 | Nagashima et al. ............ | 56/257 |
| 4,909,025 A * | 3/1990 | Reissig et al. ................... | 56/257 |
| 5,044,146 A | 9/1991 | Nakamura | |
| 5,778,727 A * | 7/1998 | Richardson et al. ............. | 74/60 |
| 6,305,154 B1 * | 10/2001 | Yang et al. ....................... | 56/298 |
| 6,510,681 B2 * | 1/2003 | Yang et al. ....................... | 56/298 |
| 6,698,177 B1 | 3/2004 | Akehi et al. | |
| 6,796,204 B2 * | 9/2004 | Verhulst et al. ................. | 74/640 |
| 7,047,713 B2 | 5/2006 | van Wouw | |
| 7,121,074 B1 | 10/2006 | Regier et al. | |
| 7,401,458 B2 * | 7/2008 | Priepke ........................... | 56/296 |
| 7,520,118 B1 * | 4/2009 | Priepke ........................... | 56/257 |
| 7,658,059 B2 * | 2/2010 | Majkrzak ........................ | 56/264 |
| 7,730,709 B2 * | 6/2010 | Priepke ........................... | 56/257 |
| 7,805,919 B2 * | 10/2010 | Priepke ........................... | 56/257 |
| 7,810,304 B2 * | 10/2010 | Priepke ........................... | 56/257 |
| 2005/0086919 A1 * | 4/2005 | Stiefvater et al. .............. | 56/10.8 |

(Continued)

FOREIGN PATENT DOCUMENTS

DE 3931736 4/1991

*Primary Examiner* — Arpad Fabian-Kovacs
(74) *Attorney, Agent, or Firm* — Michael G. Harms; Patrick M. Sheldrake

(57) ABSTRACT

The epicyclical drive incorporates a dual flywheel carrying a pinion in a balanced axially compact assembly. The assembly includes a counterweight for the pinion nested between the flywheels, which also connects the flywheels and transfers loading conditions therebetween, to reduce and distribute torsional and eccentric loading conditions and reduce vibrations. The use of a second flywheel also provides an improved rotary seal capability for keeping out dust, debris and moisture. The drive is adapted for incorporation into a floor of a header of an agricultural harvesting machine for reciprocatingly driving a sickle thereof, advantageously jointly with a mirror image companion drive in a side by side relationship and timed such that forces generated by the reciprocating actions are cancelled.

18 Claims, 11 Drawing Sheets

U.S. PATENT DOCUMENTS

| | | | |
|---|---|---|---|
| 2008/0148701 A1* | 6/2008 | Priepke | 56/17.6 |
| 2009/0107098 A1* | 4/2009 | Priepke | 56/158 |
| 2009/0145096 A1* | 6/2009 | Priepke | 56/257 |
| 2009/0145097 A1* | 6/2009 | Priepke | 56/257 |

* cited by examiner

DUAL FLYWHEEL AXIALLY COMPACT EPICYCLICAL DRIVE

TECHNICAL FIELD

This invention relates generally to an epicyclical drive incorporating a dual flywheel and pinion assembly in a counterbalanced axially compact arrangement, which reduces torsional and eccentric loading and vibrations during operation and provides an improved seal, and which is particularly well adapted for incorporation into a floor of a header of an agricultural harvesting machine for driving the sickle thereof.

BACKGROUND ART

Epicyclical drives are noted for their utility for converting rotary motion to reciprocating linear motion, in a variety of applications, notably, sickles. Sickles are commonly used on agricultural plant cutting machines, particularly on the headers of combines, windrowers and other harvesting machines. Such sickles typically include cutter bars supporting a row of knives, have been used to cut plants, including, but not limited to, hay, grasses, small grains and the like.

The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

The knife assembly is driven reciprocatingly longitudinally by an oscillating drive, which can include, but is not limited to, an eccentric shaft on a rotating hub, a wobble drive, an epicyclical drive, or a similar well known commercially available device. Reference in regard to known epicyclical drives, Regier et al., U.S. Pat. No. 7,121,074, issued Oct. 17, 2006 and entitled Balanced Epicyclic Sickle Drive. Such drives typically have a large axial extent, which in this context is vertical, and thus by necessity are located at the sides of the header, and drive the knife assembly from the end. This location is advantageous as it allows the driving point for the knife assembly to be in line with the stationary bar, provides clearances for removal of the knife assembly, and provides space for assembly of the drive. Disadvantages of the side location include that the header must include significant frame structure for supporting the drive and to withstand forces and vibrations generated thereby. The end structure or crop divider at the end of the header must also be relatively wide, to accommodate the drive and to direct adjacent standing crops therepast, and increasing the possibility of unavoidably pushing over adjacent standing crops. Additionally, for headers utilizing two drives located on opposite sides of the header, it is usually desired to time the operation of the drives such that the forces and vibrations generated by the respective drives and reciprocating knife assemblies cancel one another. This typically involves relatively long mechanical drive lines connecting the two drives together, which is disadvantageous as it adds weight, cost and complexity.

The vertical axis epicyclical drive of U.S. Pat. No. 7,121,074 referenced above uses a large rotating counterweight in an attempt to counterbalance the knife assembly driven thereby, but the knife assembly travels in only the side to side direction, and thus requires only counterbalancing in those directions, whereas the large counterweight rotates eccentrically through a circular swing arc, and thus introduces eccentric loads in the other directions, most notably the fore and aft directions. Additionally, as the weight of the knife assembly is increased, e.g., for a longer sickle, the counterbalance must be correspondingly increased, which increases the fore and aft eccentric loading condition.

To illustrate the magnitude of the vibrational challenges associated with eccentric loading conditions generated by sickle drives, a knife assembly will weigh at least 30 pounds for a typical 20 foot wide header, and typically must accelerate and decelerate two times per cycle as a result of the reciprocating movement. A typical speed for the knife assembly is up to about 16 hertz or cycles per second. Thus, it can be seen, the reciprocating motion at a high cycle per second generates high acceleration values and high deceleration values that in turn generate high forces on the structural components. These high forces can have at least two negative effects, vibration at and within the drive system that may be transmitted to other components of the machine, and torsional and vibration related failure of the structural components of the drive itself, and also the seals thereof. To compound the seal failure problem, operation of plant cutting machines typically generates substantial dust and plant fragments that can rapidly damage seals and infiltrate the drive to cause failure thereof.

Driving a knife assembly or assemblies of a header from a more central location, such as the center of the header, would provide several advantages compared to a side location. Notably among these advantages, the header structure, typically supported at the center, would not be required to support heavy drive units on one or both sides, such that the structure of the header could be lighter. Long timing apparatus extending between the ends could also be eliminated. If the drive mechanism is incorporated into a location that would not interrupt or require dividing crop or plant material flow through the crop flow area of the header, the normal crop flow of the header is not be significantly impacted. And, since the drives are not located in the ends, the end dividers can be made significantly thinner, such that the header can have a shorter overall width, would be more easily maneuverable in relation to adjacent standing crop, and danger of downing the adjacent standing crop would be reduced. Additionally, it has been found that by driving two knife assemblies in opposite directions from a location between the two assemblies, the forces generated by the opposite reciprocating movements of the assemblies translated to the frame of the header can be largely cancelled, essentially leaving only the vibrational loads generated by the drives themselves to be dealt with.

Thus, what is sought is an epicyclical drive adapted for a sickle of a header of an agricultural cutting machine, such as a combine or windrower, which provides at least one of the advantages, namely, a compact axial extent and low eccentric loading and vibrations, and which overcomes one or more of the problems, negative effects, and disadvantages, referenced above.

SUMMARY OF THE INVENTION

What is disclosed is an epicyclical drive adapted for a sickle of a header of an agricultural cutting machine, such as a combine or windrower, which provides at least one of the advantages, namely, a compact axial extent and low eccentric loading and vibrations, and which overcomes one or more of the problems, negative effects, and disadvantages, referenced above.

According to a preferred aspect of the invention, the epicyclical drive includes a generally flat housing or frame including a ring gear extending around a passage through the frame and defining a central axis through the passage, the passage having a first axial end and a second axial end opposite the first axial end. The drive is configured to be axially compact, and includes a dual flywheel and pinion assembly including a first flywheel supported on the housing or frame adjacent to the first axial end of the passage for rotation about the central axis, and a second flywheel supported on the frame adjacent to the second axial end of the passage for rotation about the central axis in coaxial relation to the first flywheel. The drive includes a pinion shaft extending through the passage and supported by the first flywheel and the second flywheel eccentric to the central axis for rotation about an eccentric axis parallel to the central axis, the pinion shaft carrying a pinion gear for rotation therewith enmeshed with the ring gear such that rotation of the flywheels about the central axis will cause the pinion gear to rotate about the eccentric axis. And, the drive includes a counterweight carried by and between the flywheels in the passage for eccentric rotation about the central axis in a manner to at least partially counterbalance the pinion shaft and the pinion gear when rotating.

To facilitate the axial compactness, the flywheels are preferably relatively flat, disk shaped members located just above and below the flat frame. And because the flywheels are both supported by the frame, and, in turn, support the pinion therebetween for eccentric rotation, counterbalanced by the counterweight, any significant eccentric and torsional loading conditions generated by these components are eliminated or reduced to a non-consequential level.

According to another preferred aspect of the invention, to drive a sickle, the pinion shaft is connected in reciprocatingly driving relation to a knife assembly of the sickle, by a drive assembly configured and operable for translating the eccentric rotation of the pinion shaft to a reciprocating back and forth motion of the knife assembly.

According to another preferred aspect of the invention, the second flywheel is disposed and configured so as to provide a sealed condition about the second axial end of the passage, to prevent entry of dust and debris such as plant fragments, and also moisture, into the inner workings, such as the ring and pinion gear mechanism. As another feature, the counterweight is connected to the flywheels by fasteners such as pressed fit pins, screws or bolts, or the like, to enable easy assembly and disassembly.

According to another preferred aspect of the invention, a second epicyclical drive constructed as a mirror image is provided in driving relation to a second knife assembly of the sickle, in oppositely timed relation to the first, such that vibrations generated by the reciprocating actions of the respective drives are cancelled by one another. According to still another preferred aspect of the invention, the first and second epicyclical drives are jointly driven by a drive element connected in driving relation to the flywheels for rotating the pinion shafts in the timed relation. This drive element can comprise, but is not limited to, input gears disposed about the radial outer peripheries of one of the flywheels of each of the respective drives, and a bevel gear arrangement including a gear enmeshed in driving relation with the input gears.

As still another preferred aspect of the invention, the epicyclical drive is adapted to be located beneath, or incorporated into, a floor or pan of a header of a plant cutting machine such as a combine or windrower, at a location spaced from the sides or ends of the header, such that cut crops or other plant material can flow over and around the drive and not be obstructed thereby.

As an advantage of the invention, the dual flywheel and pinion assembly substantially eliminates eccentric and torsional loading conditions emanating from the internal mechanism of the drive to the header, and the vibrations and damage that can result. This feature, when combined with the use of dual drives timed to oppositely reciprocate the knife assemblies of the sickle, provides a greatly reduced vibrational output overall for smoother operation and reduced failure. In this regard, the dual flywheels are preferably connected together for joint rotation, e.g., using pinned connections, preferably through the counterweight, which enables side and torsional loads to be transferred or distributed through and between the flywheels, to reduce load concentrations on the flywheels individually and on the pinion. For instance, at least a portion of the drive forces exerted as side and torsional loads against the driven one of the flywheels are transferred through the connection directly to the other flywheel. And, portions of loads exerted by the reciprocating action of the knife assembly on the more proximal flywheel are transferred to the other flywheel through the connection, such that, overall, the dual flywheel and pinion assembly is robust and resistant to damage.

DETAILED DESCRIPTION OF THE INVENTION

Figure 1:
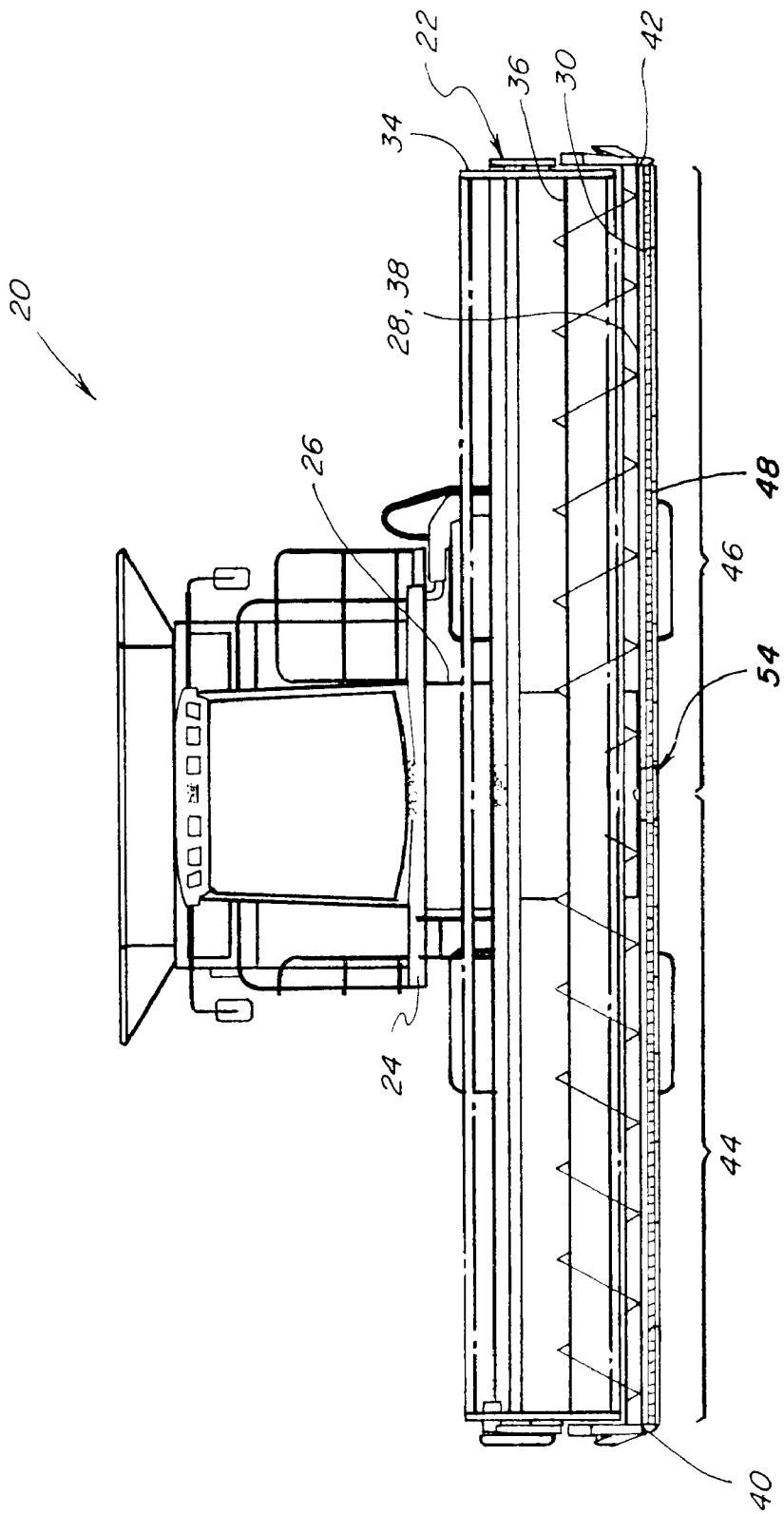
FIG. 1 is a forward end view of a combine including a header having an axially compact epicyclical sickle drive mechanism according to the present invention.

Turning now to the drawings wherein several preferred embodiments of the invention are shown, in FIG. 1, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field. Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the crop for induction into header 22, as will be explained. Header 22 additionally includes an elongate, sidewardly extending reel 34 disposed above sickle 30 and rotatable in a direction for facilitating induction of the severed crops into header 22. An elongate, rotatable auger 36 (shown in outline form in FIG. 1) that extends in close proximity to a top surface 38 of floor 28 and has helical flights therearound (not illustrated) is operable in cooperation with reel 34 for conveying the severed crops toward an inlet opening of feeder 26 for induction into combine 20, in the well-known manner.

Sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 2:
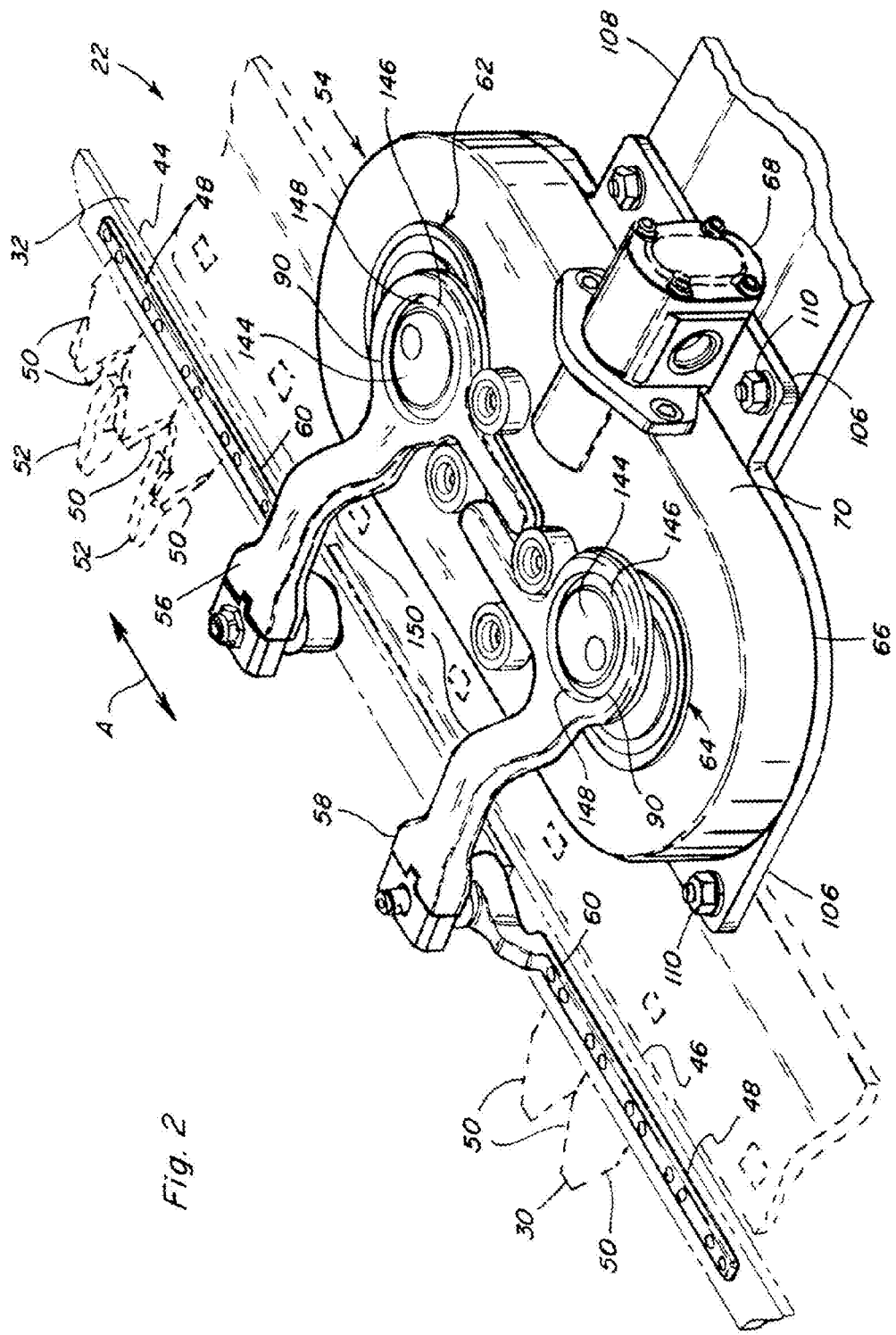
FIG. 2 is an enlarged fragmentary perspective view of the header of FIG. 1, showing the drive mechanism of the invention and aspects of the sickle.
Figure 3:
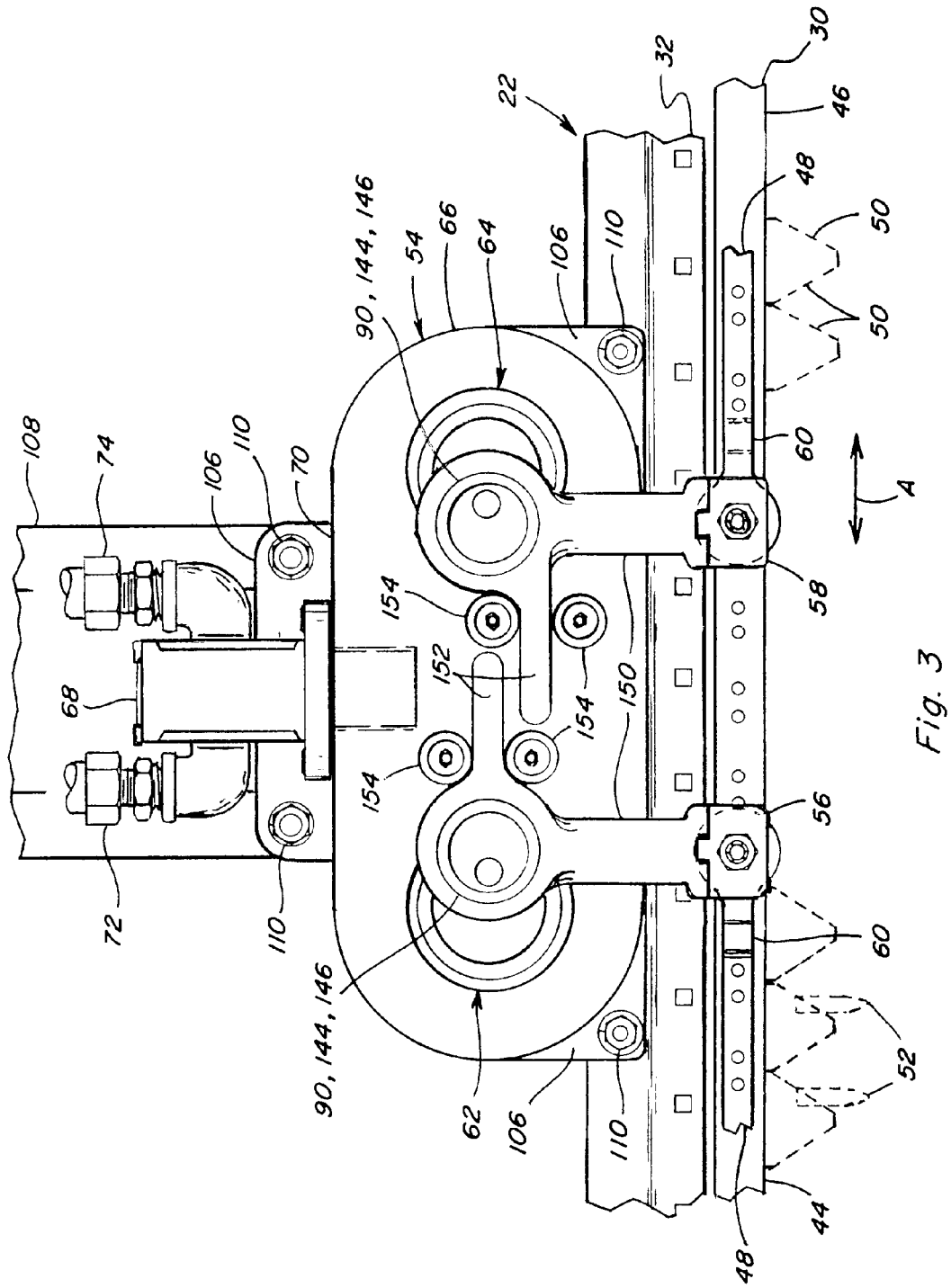
FIG. 3 is an enlarged fragmentary top view of the header of FIG. 1, showing the drive mechanism and aspects of the sickle.

Referring also to FIGS. 2 and 3, each of cutter bar assemblies 44 and 46 supports and restrains an elongate knife assembly 48 for reciprocating longitudinal movement, each knife assembly 48 including a row of knife sections including oppositely facing, angularly related knife edges 50, which, in conjunction with adjacent guards 52, effects a shearing or cutting action which severs plant stems and stalks or other material captured between the knives and the guards as the knife sections are reciprocatingly moved sidewardly, as denoted by arrows A, all in the well known manner.

As noted above under the Background Art heading, it is desirable to reduce negative effects of the reciprocating sideward motion of knife assemblies 48, including, but not limited to, vibration, fatigue failure, and the like, and also the disadvantages of known structures for effecting the motion, including the need for substantial structure for supporting drives on the sides of headers, the increased width of side dividers containing the drives, and apparatus for timing drives located on opposite sides of a header. It is also desirable to eliminate or substantially reduce eccentric and torsional loading conditions generated within the drives themselves which can be damaging to the drives and supporting structure, and transmit vibrations to the header and supporting machine, e.g., combine.

Reduction of the above discussed negative effects and disadvantages is achieved according to the present invention by utilizing an improved compact epicyclical drive mechanism 54 constructed and operable according to the teachings of the present invention for reciprocatingly driving knife assemblies 48.

Epicyclical drive mechanism 54 is illustrated in FIG. 1 at a location on header 22 between side edge portions 40 and 42 which is at about the center of header 22, although it should be noted that it is contemplated that drive mechanism 54 could alternatively be utilized at other locations on a header such as header 22, and that multiple drive mechanisms 54 could be used on a header, as described hereinafter and illustrated in FIGS. 10 and 11.

As shown in FIGS. 2 and 3, compact epicyclical drive mechanism 54 includes a first knife head driver element 56 in connection with the knife assembly 48 of first cutter bar assembly 44, and a second knife head driver element 58 in connection with the knife assembly 48 of second cutter bar assembly 46, knife head driver elements 56 and 58 being simultaneously operable by drive mechanism 54 for reciprocatingly driving the knife head assemblies 48 of respective cutter bar assemblies 44 and 46 sidewardly, as illustrated by arrows A, in timed relation so as to move in opposite sideward directions. That is, as knife assembly 48 of first cutter bar assembly 44 is moved in one sideward direction, knife assembly 48 of second cutter bar assembly 46 will be moved in the opposite sideward direction. The length of the sideward movements, or strokes, will be sufficient for providing the desired cutting action, which will typically be equal to about the sideward extent of a knife edge 50 of a typical knife section. First and second knife head driver elements 56 and 58 are preferably constructed of a sheet or cast metal bent or formed to a sectional shape about as shown, and are connected to knife assemblies 48 of the respective cutter bar assemblies 44 and 46 in a suitable manner, here using sidewardly extending elongate bars 60 on the forward ends of driver elements 56 and 58, which connect to the knife assemblies 48 with suitable fasteners such as screws or the like. Here, it should be noted that it is desired for the knife assemblies 48 to move only in the sideward directions relative to guards 52, and not forwardly, rearwardly, upwardly or downwardly to any significant extent relative thereto. Because driver elements 56 and 58 are rigidly connected with knife head assemblies 48, respectively, driver elements 56 and 58 are also restricted to sideward movements only.

Compact drive mechanism 54 includes a first epicyclical drive 62 connected in driving relation to first knife head driver element 56, and a second epicyclical drive 64 connected in driving relation to second knife head driver element 58, epicyclical drives 62 and 64 being contained in a compact common housing 66 of drive mechanism 54.

It is contemplated and preferred that compact drive mechanism 54 be incorporated in or beneath floor 28 of header 22, in a manner such that cut plant material, particularly crops, cut by those portions of cutter bar assemblies 44 and 46 forwardly of drive mechanism 54 will be able to relatively smoothly and uninterruptedly flow over and around drive mechanism 54 onto floor 28, and so as to subsequently be conveyed, for instance, by reel 34 and auger 36, to the inlet of feeder 26 of combine 20. To facilitate this, drive mechanism 54 is vertically compact, preferably having a vertical extent of no more than about six inches. It is also contemplated that drive mechanism 54 can be supported so as to float upwardly and downwardly with the cutterbar assemblies 44 and 46 as typical when harvesting grains, such as soybeans. Additionally, the apparatus of the invention can be configured for use with flexible sickles or cutter bars assemblies, as well as variable floor headers wherein the cutter bar assembly and possibly a leading edge of the floor is fore and aft movable relative to the more rearward region of the floor.

Knife assemblies 48 are preferably reciprocatingly driven in timed relation by the respective epicyclical drives 62 and 64 of mechanism 54 so as to move in opposite sideward directions, such that forces generated by the moving masses of the knife assemblies are at least substantially contained within the structure of the invention, thereby substantially reducing or eliminating transfer of vibrations to the structure of header 22, and, from there to combine 20.

Preferably, drives 62 and 64 are commonly driven, by, but not limited to, a fluid motor 68. Fluid motor 68 is illustrated as being mounted to a rear end 70 of housing 66. Fluid motor 68 is connected to a source of pressurized fluid and a fluid reservoir (not shown) on combine 20 in the conventional, well-known manner, via fluid lines 72 and 74 (FIG. 3). This provides the power to first and second epicyclical drives 62 and 64, which are configured to translate the power into the sideward reciprocating movements of first and second knife head driver elements 56 and 58, and thus of knife assemblies 48, as will be explained. Alternatively, drive mechanism 54 can be driven by an alternative power source, which can include, but is not limited to, a PTO shaft, or an electric motor, or other common driver such as a belt or chain or a combination of such drives. In either of the illustrated instances, the alternative power source can be connected in rotatably driving relation to drive mechanism 54 via an input shaft or other suitable manner of connection. Representative contemplated configurations of header 22, sickle 30, support apparatus for drive mechanism 54, and alternative power sources, are disclosed and illustrated in detail in Priepke U.S. Pat. No. 7,520,118 B1, issued Apr. 21, 2009, hereby incorporated herein by reference in its entirety.

Figure 4:
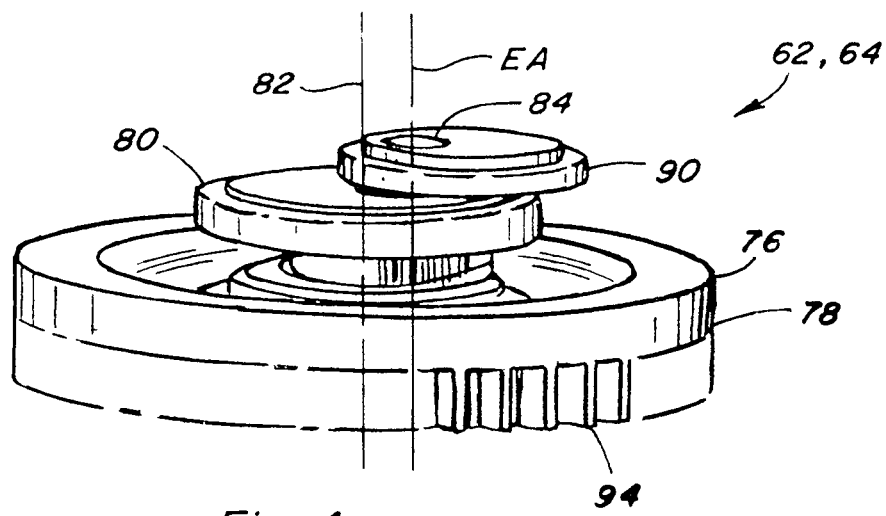
FIG. 4 is an enlarged perspective view of a dual flywheel and pinion assembly of a drive of the drive mechanism.
Figure 5:
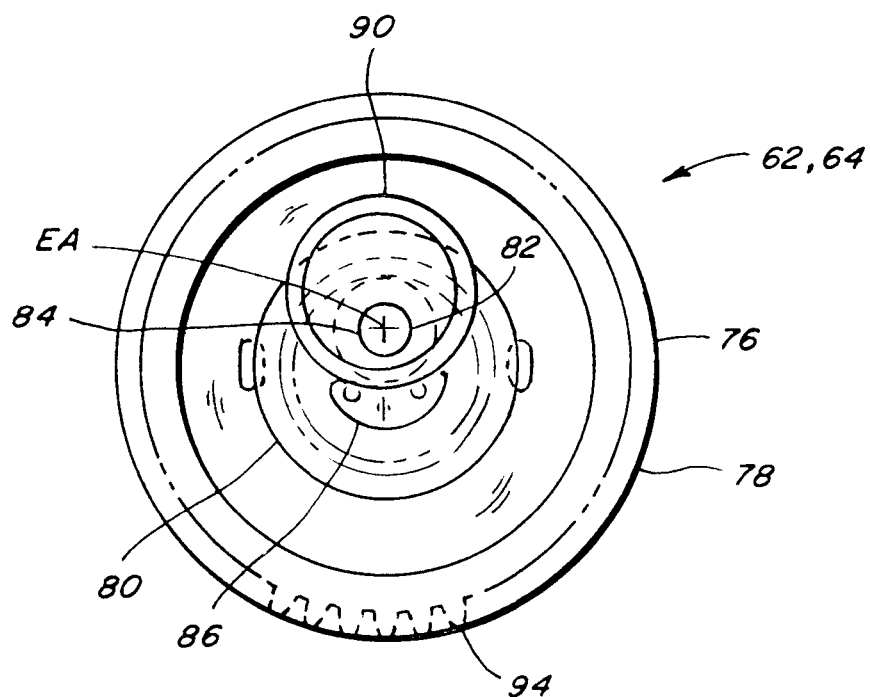
FIG. 5 is an enlarged top view of the dual flywheel and pinion assembly of FIG. 4.
Figure 6:
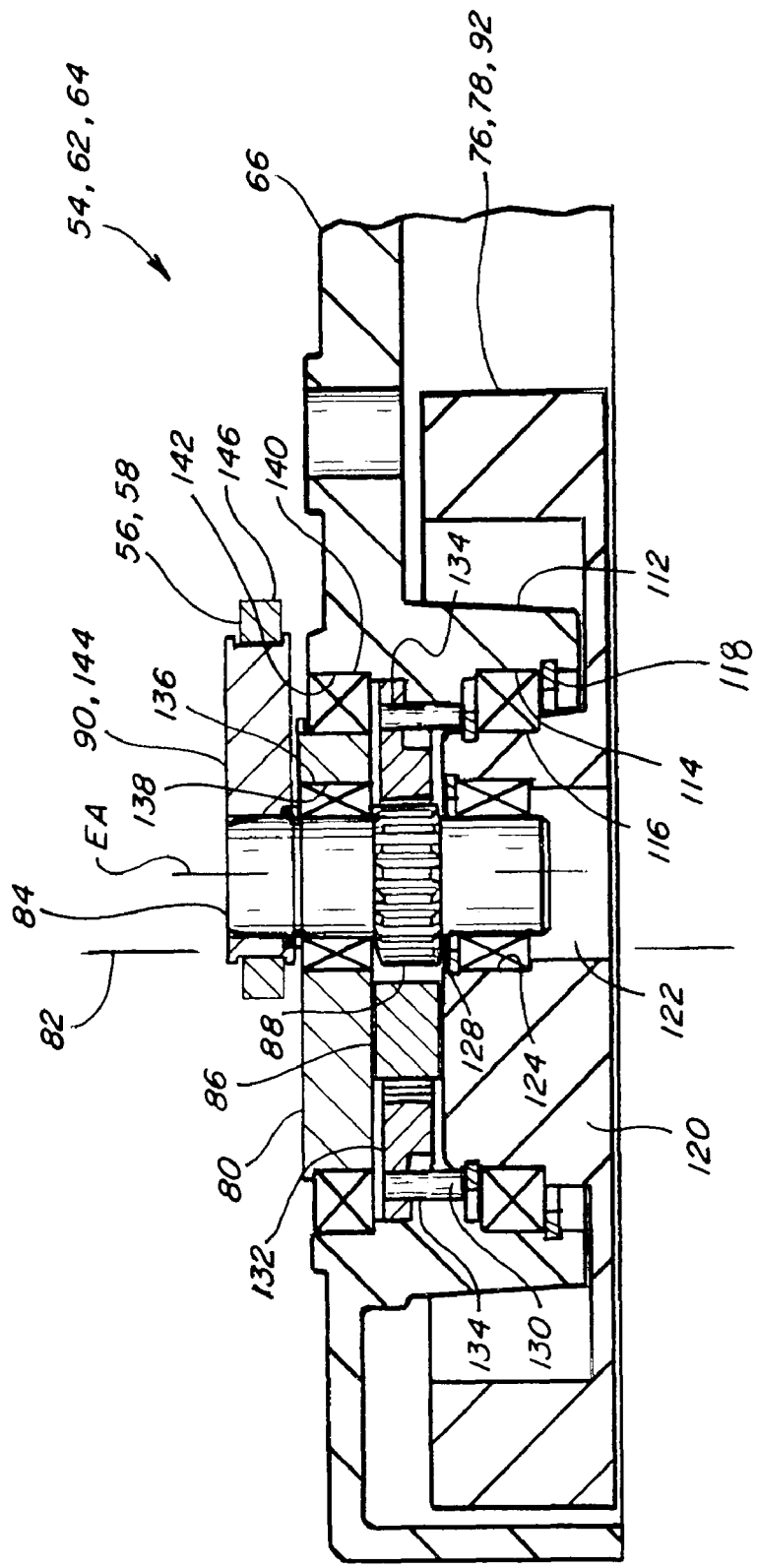
FIG. 6 is a sectional view of the drive mechanism, showing aspects of an epicyclical drive thereof, including the dual flywheel and pinion assembly thereof.
Figure 9:
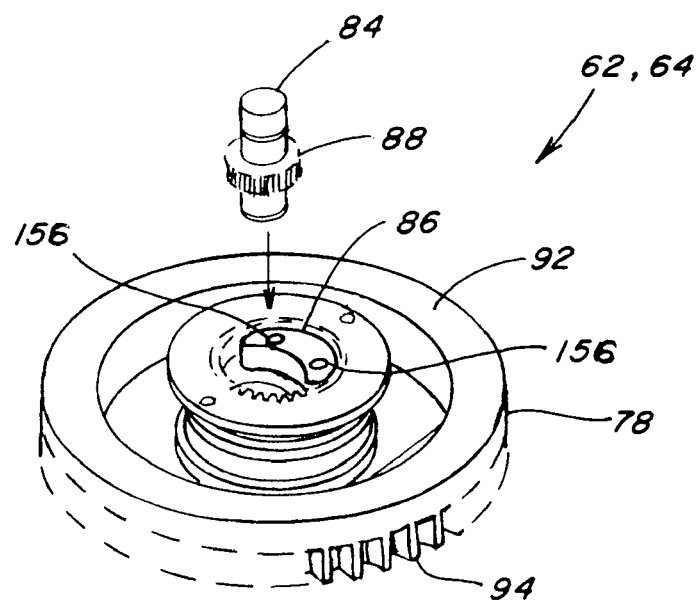
FIG. 9 is a perspective view showing aspects of one of the dual flywheel and pinion assemblies of the drive mechanism, showing installation of the pinion thereof.
Figure 8:
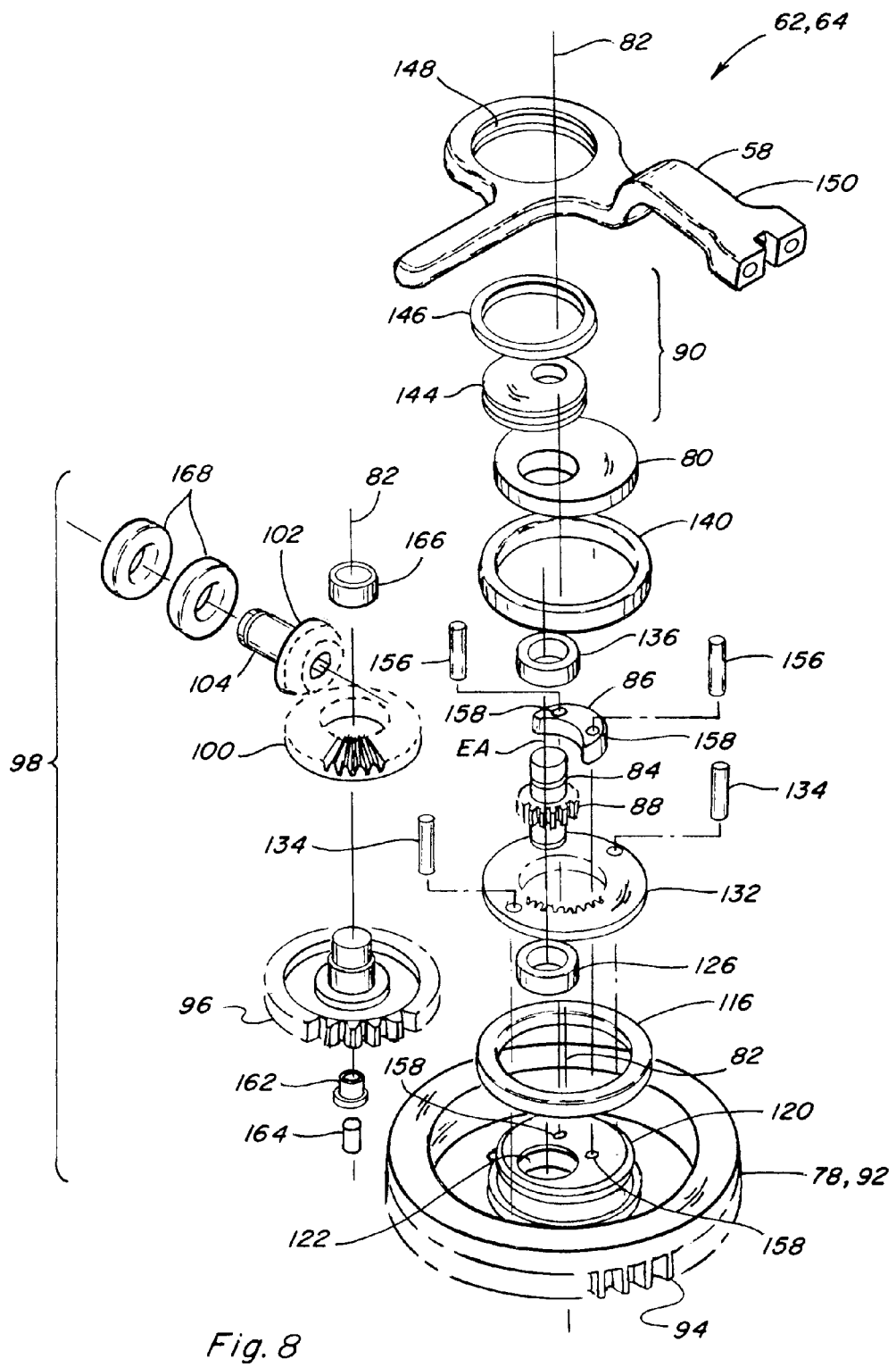
FIG. 8 is an exploded view showing aspects of an epicyclical drive of the drive mechanism.

Referring also to FIGS. 4, 5, 6, 6a, 7, 8 and 9, aspects of drive mechanism 54 and drives 62 and 64 are shown to illustrate the features of the invention, namely, the vertical or axial compactness of the drives, as well as reduced eccentric and torsional loads and vibrations generated by operation of the drives, and an improved seal capability. In particular in this regard, FIGS. 4 and 5 illustrate a balanced dual flywheel and pinion assembly 76 common to each of drives 62 and 64. Each balanced dual flywheel and pinion assembly 76 includes a generally flat, disk shaped first flywheel 78, and a similarly generally flat, disk shaped second flywheel 80, connected together for coaxial, joint rotation about a central rotational axis 82 of the respective drive 62 or 64. Here, it can be observed that flywheel 78 is larger than flywheel 80, but assembly 76 is not limited to this configuration. Flywheels 78 and 80 carry a pinion shaft 84 therebetween for rotation eccentrically relative thereto, about an eccentric axis EA parallel to axis 82. Flywheels 78 and 80 additionally carry a crescent shaped counterweight 86 therebetween, in eccentric offset and counterbalancing relation to pinion shaft 84 and a pinion gear 88 thereof (FIGS. 6, 8 and 9).

Counterweight 86 of each dual flywheel pinion assembly 76 connects flywheels 78 and 80 of the assembly together for joint rotation about axis 82, e.g., using fasteners 156 (FIGS. 6a, 6b, 8 and 9) in a manner for also advantageously transmitting eccentric and torsional loads therebetween, including the driving or motive force for rotating the flywheel pinion assembly; the driving force of pinion shaft 84; and also eccentric loads generated by the translation of the rotational forces to the reciprocating action of the associated knife assembly, as will be explained. Also shown, is a puck bearing assembly in connection with pinion shaft 84 above dual flywheel assembly 76, operable in connection with knife head driver element 56 or 58 (FIGS. 2 and 3) for translating the eccentric rotations of the pinion shaft into the reciprocating actions of the associated knife assembly connected to driver element 56 or 58.

Referring also more particularly to FIGS. 6, 7, 8 and 9, to power the drives 62 and 64, first flywheel 78 of each of the drives 62 and 64 has a radial outer periphery comprising a flange 92 including an input gear 94 thereabout, enmeshed with a spur gear 96 of a compact common drive element 98, preferably disposed between flywheels 78 and operable for simultaneously rotating them in opposite directions about their respective rotational axis 32. Drive element 98 additionally includes a bevel gear 100 combined for joint rotation with a spur gear 96 on a common shaft, and which is enmeshed with a bevel gear 102 also of drive element 98, providing a 90 degree drive capability. Bevel gear 102, in turn, is located on an input shaft 104 connected to fluid motor 68 (FIGS. 2 and 3), or other rotary power source for rotation thereby, e.g., PTO shaft, electric motor, etc. As a result, in operation, rotation of motor 68 (or other input) will rotate shaft 104 and gear 102, to rotate gear 96, which will rotate input gears 94 and flywheels 78, and thus drives 62 and 64 in opposite directions.

Dual flywheel pinion assemblies 76 of drives 62 and 64, as well as drive element 98, are compactly contained within or on housing 66. Housing 66 is a generally flat structure of unitary construction, preferably of cast or welded metal, and includes mounting lugs 106 positioned for attachment to a suitable structural element of header 22. Here, such structure is a support arm 108 supporting a section of sickle 30, and housing is mounted thereto by fasteners 110, as shown in FIGS. 2 and 3, although it should be understood that other manners of support and attachment to the header could be used.

Within housing 66, first flywheel 78 of each drive 62 and 64 is mounted for rotation about central rotational axis 82 of the drive, to a downwardly extending annular bearing flange 112 of housing 66, which defines a downwardly facing round cavity. Flange 112 includes an inner circumferential bearing seat 114 into which a lower flywheel bearing 116 is suitably mounted and retained, for instance, using a snap ring 118. Flywheel 78 includes an inner hub 120 disposed radially inwardly of outer flange 92 sized to be received in the downwardly open cavity and having an outer circumferential surface around which lower flywheel bearing 116 is retained, for instance, by a press fit, snap ring, or other suitable manner of mounting. Thus, lower flywheel bearing 116 is received in an annular space between outer flange 92 and hub 120, such that outer flange 92, bearing 116, and inner hub 120 are concentric about rotational axis 82. Installation of ring 118 can be accomplished, for instance, using one or more holes that can be provided through flywheel 78, or in any other suitable manner. Hub 120 of flywheel 78 includes a hole 122 therein at a location offset from central rotational axis 82, and through which eccentric axis EA extends, parallel to, but offset from rotational axis 82. A bearing seat 124 extends around a portion of hole 122 and receives a lower pinion bearing 126 which is suitably retained in position by a retainer ring 128, a press fit, or like.

The lower end of pinion shaft 84 is received in and supported by lower pinion bearing 126 for rotation relative to flywheel 78, and extends upwardly through a central passage 130 extending through housing 66 and concentric about central rotational axis 82, such that hub 120, and thus flywheel 78, serve as a carrier for the lower end of pinion shaft 84 disposed in or closely adjacent to a lower end of passage 130. Flywheels 78 of the respective drives are disposed in timed relation to each other, such that eccentric axes EA, and thus pinion shafts 84, will be in about 180 degree offset relation, essentially in the manner disclosed and illustrated in detail in Priepke U.S. Pat. No. 7,520,118 B1 incorporated herein by reference. This timed relationship facilitates the desired opposite reciprocating movements of the knife assemblies, in the manner as also illustrated and explained in U.S. Pat. No. 7,520,118 B1.

To translate the rotational movements of the drives into reciprocating movements of the knife assemblies, each of drives 62 and 64 includes a ring gear 132 fixedly mounted on or incorporated into housing 66 about the respective passage 130, for instance, using pins 134, press fit, or other fasteners. Pinion gear 88 of each drive is enmeshed with the ring gear 132 thereof, such that when flywheel 78 is rotated about central rotational axis 82, pinion gear 88 will cause pinion shaft 84 to rotate therewith about eccentric axis EA, while circling or orbiting about central rotational axis 82. Here, to facilitate and effect the timed relationship between pinion shafts 84, the internal pitch diameter of ring gear 132 is preferably selected to be equal to twice the pitch diameter of pinion gear 88, such that for each revolution of flywheel 78, pinion shaft 84 and pinion gear 88 about central rotational axis 82, pinion shaft 84 and gear 88 will be rotated two revolutions about eccentric axis EA, which will be translated into back and forth movements of the associated puck bearing assembly 90, and thus the knife head driver element 56 or 58 connected thereto.

The upper end of pinion shaft 84 is supported for rotation about eccentric axis EA on second flywheel 80 by an upper pinion bearing 136 mounted in a bearing seat 138 in second flywheel 80. Second flywheel 80, in turn, is supported for rotation about rotational axis 82 by an upper flywheel bearing 140 mounted in a bearing seat 142 on housing 66 adjacent an upper end of passage 130. The upper end of pinion shaft 84 extends a short distance above second flywheel 80 and fixedly connects to puck bearing assembly 90 in an eccentric relationship. A puck 144 of puck bearing assembly 90 is carried and rotatable within a bearing 146 thereof, which, in turn, is carried in a bearing seat 148 of the associated knife head driver element 56 or 58. Each knife head driver element 56 and 58 includes a connecting arm 150 which extends forwardly therefrom to connect with the respective knife assembly 48, and a torque arm 152 extending sidewardly therefrom and between a pair of rollers 154 mounted externally on the top surface of housing 66. As a result, driver elements 56 and 58 are restrained for side to side movement only, and the eccentric rotations of pinion shafts 84 will translate to oscillations of pucks 146 within the respective driver element, to cause side to side reciprocating movements of the drivers and knife assemblies connected thereto, respectively, as more thoroughly explained in U.S. Pat. No. 7,520,118 B1.

As noted above, the eccentric motion of pinion shaft 84 about axis creates a side force or loading condition within each drive 62 or 64. This is substantially countered or offset by counterweight 86 which is sized and shaped, e.g., crescent shaped, for this purpose, such that operation of the respective dual flywheel pinion assemblies 76 alone will generate only a low or no net side load. As explained above, the lower flywheel 78 is the driving input, and the driven load is connected to assembly 76 at the upper end of pinion shaft 84, above flywheel 80, such that both external side and torsional loads are distributed to and between both flywheels of assembly 76.

Figure 6A:
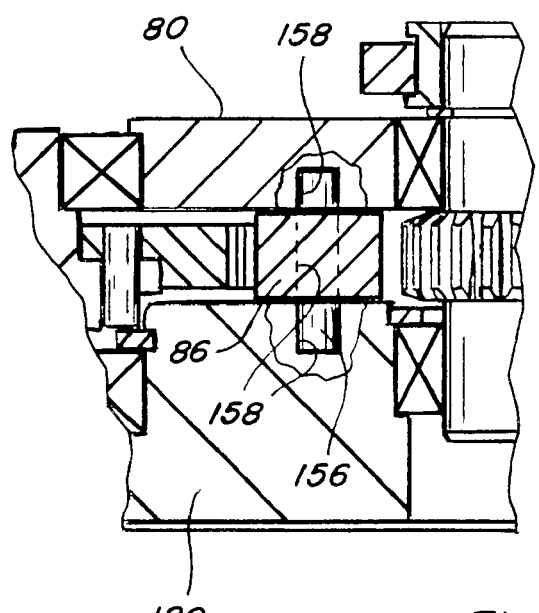
FIG. 6*a* is another sectional view of the drive mechanism, showing a pin connecting the dual flywheels and counterweight thereof.
Figure 6B:
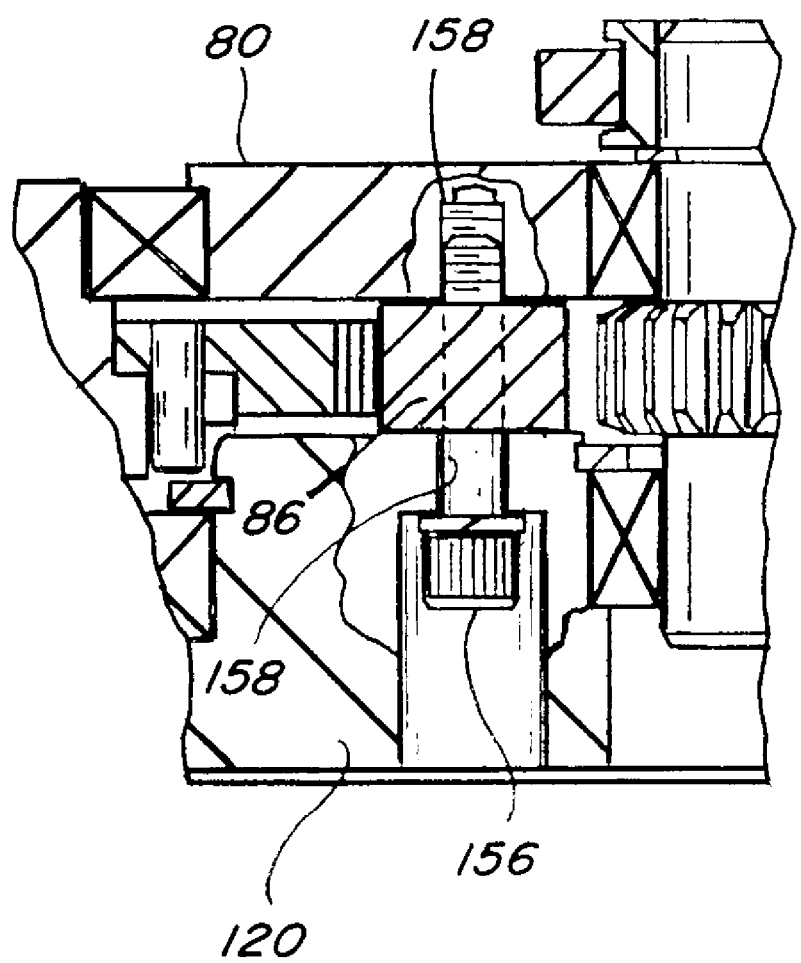
FIG. 6*b* is another sectional view of the drive mechanism, showing a screw connecting the dual flywheels and counterweight thereof as an alternative to the pin.
Figure 7:
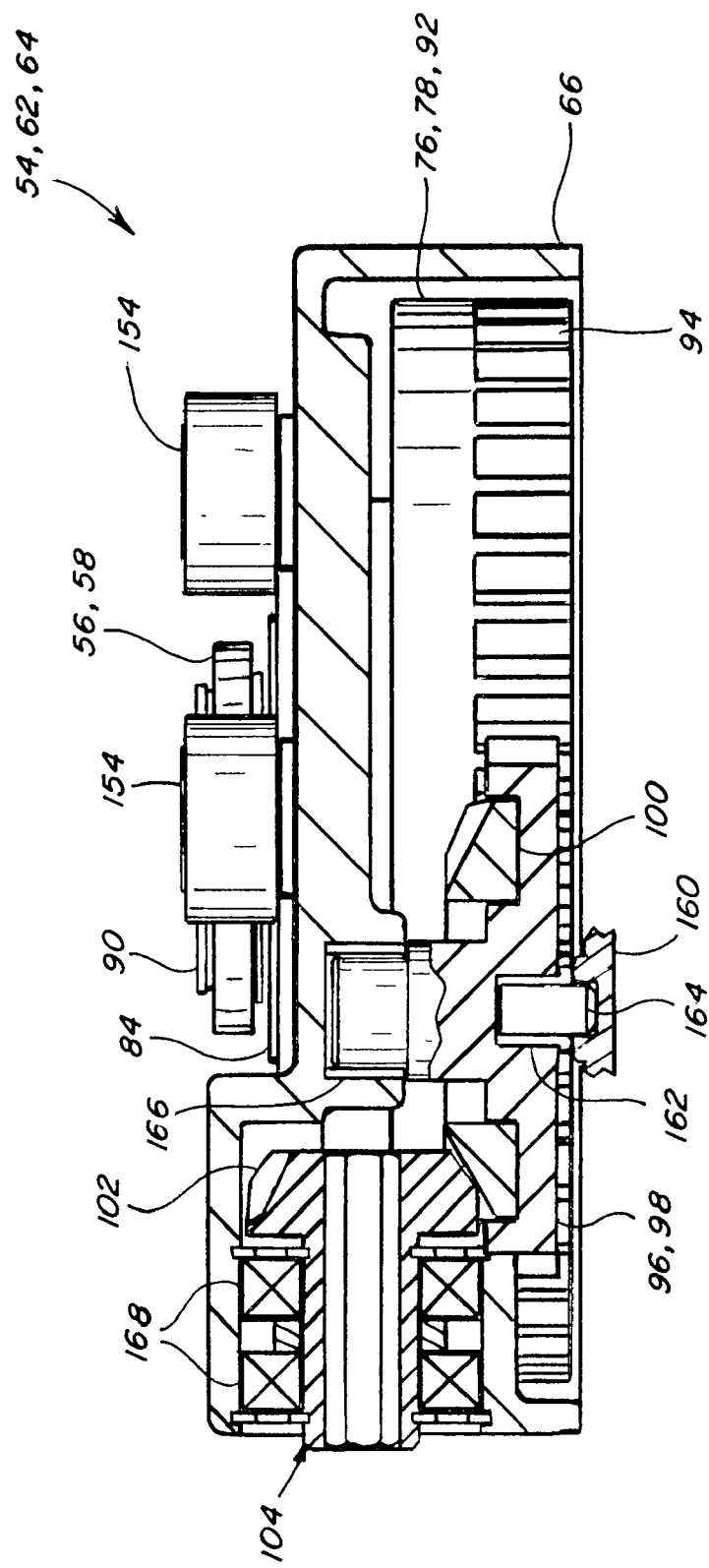
FIG. 7 is another sectional view of the drive mechanism, showing aspects of a drive element thereof for simultaneously driving the epicyclical drives thereof.

Counterweight 86 is preferably connected to both of the flywheels 78 and 80, e.g., by fasteners 156 which pass through holes 158 in counterweight 86 and both flywheels, such as press fit pins as shown in FIG. 6a, or threaded bolts or screws as shown in FIG. 6b, for connecting those members together. This enables counterweight 86 to be supported by both flywheels (as is pinion shaft 84) for better counterbalancing effect, and it more positively transfers the driving force from flywheel 78 to flywheel 80 for joint rotation, and distributes the loading condition generated by the reciprocating action of the knife head drivers and knife assemblies through both flywheels. This also serves to reduce the loading conditions exerted on the pinion shaft and bearings, thus increasing the strength and robustness of the dual flywheel and pinion assemblies for better longevity and reliability, and allows easy assembly and disassembly.

As another advantage of the invention, pinion shafts 84 can be relatively short, and the drive mechanism 54 thus axially or vertically compact, for instance, on the order of a vertical dimension of about 100 millimeters or less. Another advantage is that the pinion shafts 84 are supported by bearings at their lower and upper ends, axially closely about ring gear 132, such that bending loads and axial moments resulting from offset and eccentric loads about the ring and gear arrangement are minimized. Additionally, the flywheel bearings are about axially coextensive with the pinion bearings, such that forces are transmitted along generally straight, radial paths from the pinion bearings through the flywheel bearings to the housing, thereby avoiding complex and oblique or offset loading conditions that could lead to failures.

As another feature of drive mechanism 54 of the invention, second flywheels 80 enclose the upper ends of passages 130 of housing 66, and upper pinion bearing 136 and upper flywheel bearing 140 are preferably sealed bearings, forming a completely sealed condition about the upper end of the passage, for preventing entry of dust, debris and moisture into the inner regions and workings of mechanism 54. Additionally, sealed bearings 136 and 140 utilize annular rotary seal mechanisms which typically form a better sealed condition and are more reliable and longer lasting than alternative wiper type seals. The lower end of housing 66 can be enclosed and sealed in any desired suitable manner, such as using a generally planar bottom cover 160 of cast or sheet metal or the like.

Combined spur and bevel gears 96 and 100 of compact drive element 98 can be supported for rotation using any suitable bushing or bearing arrangement, such as compact bushing in the bottom of gear 96 that receives a pin 164 carried on cover 160, and a shaft extending upwardly from the gears and received in a bushing 166 in the body or frame of housing 66, to facilitate placement between flywheels 78. Gear 102 can also be suitably supported, for instance, by bearings 168 retained in a horizontal bore in housing 66 by snap rings or the like, such that the overall fore and aft extend of mechanism 54 can be only marginally larger than the diameters of flywheels 78.

Figure 10:
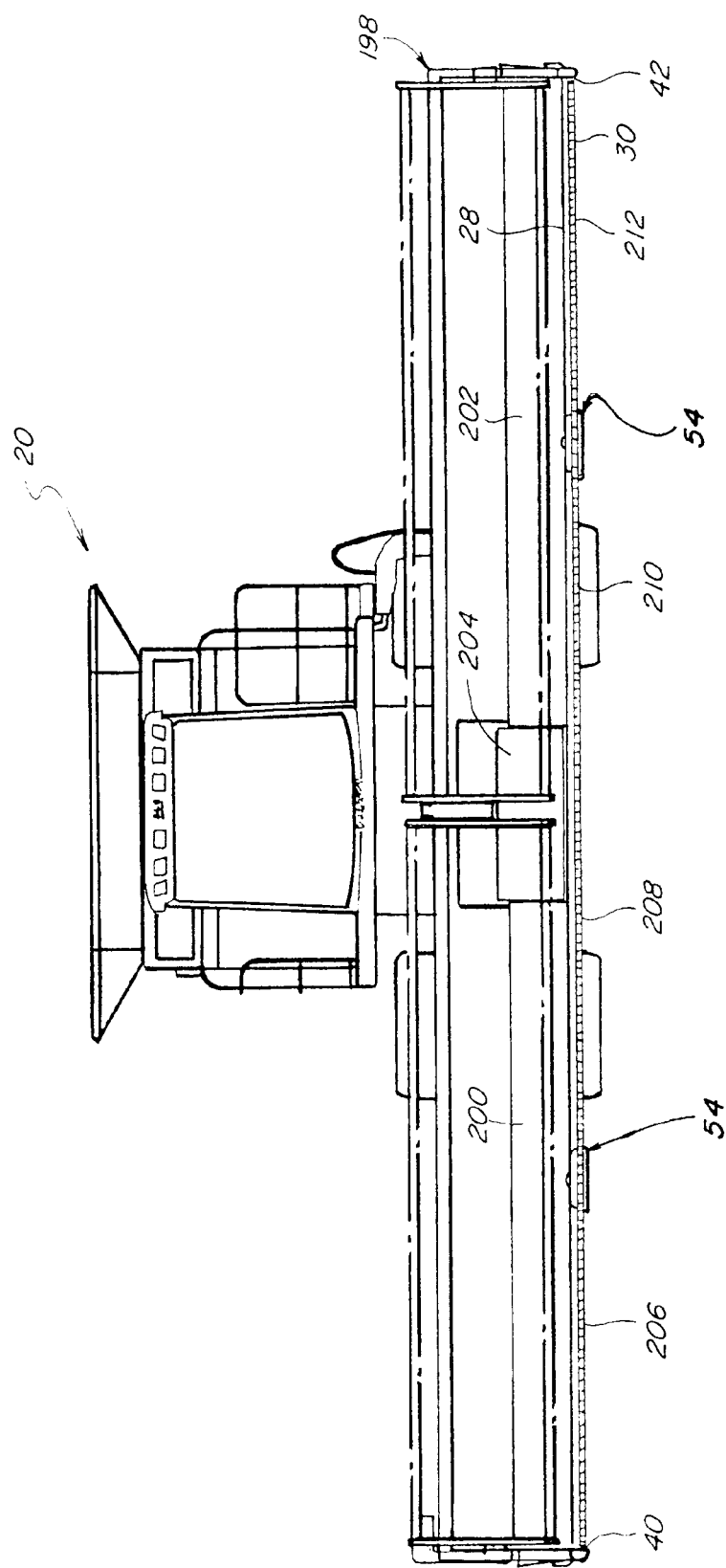
FIG. 10 is a forward end view of a combine including a header having multiple axially compact epicyclical sickle drives according to the present invention.
Figure 11:
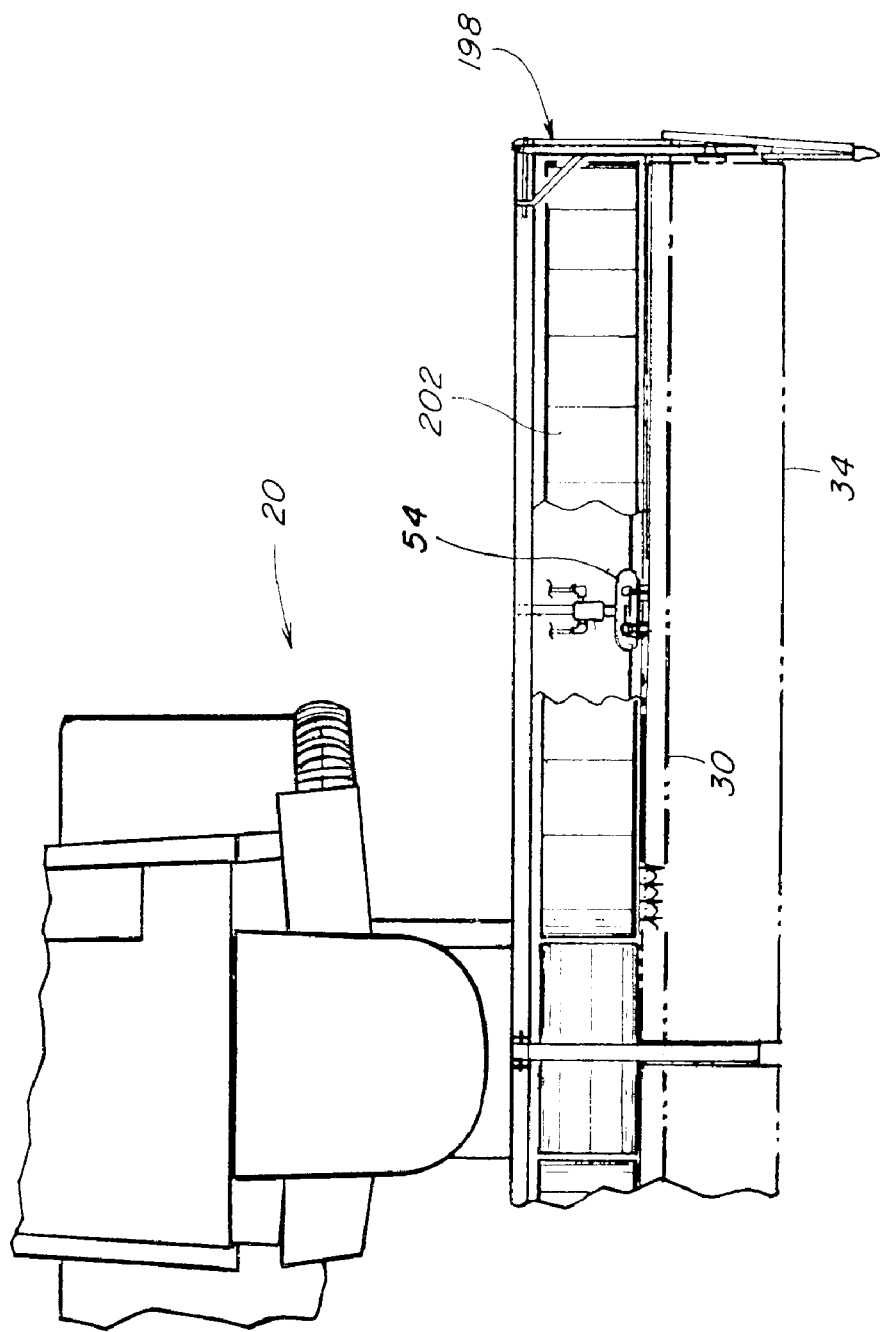
FIG. 11 is a fragmentary top view of a combine, with a portion of a draper belt of a header of the combine removed to reveal one of the epicyclical sickle drive mechanisms of the invention.

In FIGS. 10 and 11, combine 20 is shown including an alternative header 198 which is a representative draper type header, including two compact sickle drive mechanisms 54 constructed and operable according to the teachings of the present invention, like parts of header 198 and header 22 being identified by like numerals. Draper header 198 includes a sickle 30 extending across a forward edge portion 32 of a floor 28, between first and second side edge portions 40 and 42 of the floor. Sickle 30 is composed of a first cutter bar assembly 44 in end to end relation with a second cutter bar assembly 46. A reel 34 is disposed above sickle 30. A pair of elongate draper belts 200 and 202 extended sidewardly along and form a portion of floor 28, and are movable toward the center of the header for conveying cut crops through a crop conveying area to a center belt 204 operable for conveying the crop rearwardly into a mouth or inlet opening of a feeder of a combine 20. Compact sickle drive mechanisms 54 of header 198 are constructed and operable in the above-described manner, and provide all of the features and advantages of sickle drive mechanism 54 of header 22.

Here, sickle 30 of draper header 198 is comprised of four cutter bar assemblies 206, 208, 210 and 212 extending in end to end relation between edge portions 40 and 42 of a floor 28 of the header. Cutter bar assemblies 206 and 208 are connected in reciprocating sideward driven relation to compact sickle drive 54 on the left side of the machine as viewed in the drawing, and cutter bar assemblies 210 and 212 are connected in reciprocating sideward driven relation to drive 54 on the right side. Here, it can be observed in reference to FIG. 11 that drives 54 are supported beneath draper belts 200 and 202. The location of reel 34 above sickle 30 is also illustrated in FIG. 11. Thus, it should be apparent that compact sickle drive mechanisms of the invention can be used with a wide variety of header constructions.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A compact epicyclical drive, comprising:
a generally flat frame including a first ring gear extending around a first passage through the frame and defining a first central axis through the first passage, the first passage having a first axial end and a second axial end opposite the first axial end, the frame including a second ring gear extending around a second passage through the frame and defining a second central axis through the second passage, the second passage having opposite axial ends;
a first flywheel supported on the frame adjacent to the first axial end of the first passage for rotation about the first central axis;
a second flywheel supported on the frame adjacent to the second axial end of the first passage for rotation about the first central axis in coaxial relation to the first flywheel;
a third flywheel supported on the frame adjacent to a first of the axial ends of the second ring gear for rotation about the second central axis;
a fourth flywheel supported on the frame adjacent to a second of the axial ends of the second ring gear for rotation about the second central axis in coaxial relation to the third flywheel;
a first pinion shaft extending through the first passage and supported by the first flywheel and the second flywheel eccentric to the first central axis for rotation about a first eccentric axis parallel to the first central axis, the first pinion shaft carrying a first pinion gear for rotation therewith enmeshed with the first ring gear such that rotation of first and second flywheels about the first central axis will cause the first pinion gear to rotate about the first eccentric axis, and wherein the first pinion shaft is connected in reciprocatingly driving relation to a first knife assembly of a sickle;
a second pinion shaft extending through the second passage and supported by the third flywheel and the fourth flywheel eccentric to the second central axis for rotation about a second eccentric axis parallel to the second central axis, the second pinion shaft carrying a second pinion gear for rotation therewith enmeshed with the second ring gear such that rotation of the third and fourth flywheels about the second central axis will cause the second pinion gear to rotate about the second eccentric axis, the second pinion shaft being connected in reciprocatingly driving relation to a second knife assembly of the sickle;
a first counterweight carried by and between first and second flywheels in the first passage for eccentric rotation about the first central axis in a manner to at least partially counterbalance the first pinion shaft and the first pinion gear when rotating; and
a second counterweight carried in the passage by and between the third and the fourth flywheels for eccentric rotation about the second central axis in a manner to at least partially counterbalance the second pinion shaft and the second pinion gear when rotating,
first and second pinion shafts being disposed in timed relation such that first and second knife assemblies will be driven in opposite directions in a counterbalanced manner by the rotation of the first and second pinion shafts.

2. The epicyclical drive of claim 1, wherein the first pinion shaft is connected in reciprocatingly driving relation to a first knife assembly of a sickle, by a drive assembly configured and operable for translating the eccentric rotation of the first pinion shaft to a reciprocating motion.

3. The epicyclical drive of claim 2, wherein the first flywheel is located below the frame and the second flywheel is located above the frame.

4. The epicyclical drive of claim 1, wherein the first counterweight is connected to the first and second flywheels by fasteners extending therethrough.

5. The epicyclical drive of claim 1, comprising a drive element connected in driving relation to the flywheels for rotating the pinion shafts in the timed relation.

6. The epicyclical drive of claim 1, wherein the second flywheel forms a sealed condition about the second axial end of the passage.

7. The epicyclical drive of claim 1, further comprising a drive element configured and operable for rotating the first flywheel about the first central axis, and wherein the first counterweight connects the second flywheel in rotatably driven relation to the first flywheel.

8. The epicyclical drive of claim 7, wherein the first flywheel comprises an input gear disposed about a radial outer periphery thereof, and the drive element comprises a bevel gear arrangement including a gear enmeshed in driving relation with the input gear.

9. The epicyclical drive of claim 1, wherein the second flywheel is supported on the frame for rotation relative thereto by a first sealed bearing, and includes a second sealed bearing supporting the first pinion shaft.

10. A vertically compact epicyclical sickle drive, comprising:
- a generally flat, horizontally oriented housing including a first passage therethrough, a first ring gear extending about the first passage defining a first central axis therethrough, the first ring gear being disposed between a first axial end of the first passage and an opposite second axial end thereof, the housing including a second passage therethrough, a second ring gear extending about the second passage defining a second central axis therethrough, the second ring gear being disposed between a first axial end of the second passage and an opposite second axial end thereof;
- a generally flat, disk shaped first flywheel supported by the housing adjacent to the first axial end of the first passage for rotation about the first central axis;
- a generally flat, disk shaped second flywheel supported by the housing in sealed relation to the second axial end of the first passage for rotation about the first central axis in coaxial relation to the first flywheel;
- a generally flat, disk shaped third flywheel supported by the housing adjacent to the first axial end of the second passage for rotation about the second central axis;
- a generally flat, disk shaped fourth flywheel supported by the housing in sealed relation to the second axial end of the second passage for rotation about the second central axis in coaxial relation to the third flywheel;
- a first pinion shaft supported in the first passage by the first flywheel and the second flywheel eccentric to the first central axis for rotation about a first eccentric axis parallel to the first central axis, the first pinion shaft carrying a first pinion gear enmeshed with the first ring gear, and generally flat apparatus connecting the first pinion shaft in reciprocatingly driving relation to a first knife assembly of a sickle;
- a second pinion shaft supported in the second passage by the third flywheel and the fourth flywheel eccentric to the second central axis for rotation about a second eccentric axis parallel to the second central axis, the second pinion shaft carrying a second pinion gear enmeshed with the second ring gear, and generally flat apparatus connecting the second pinion shaft in reciprocatingly driving relation to a second knife assembly of the sickle;
- a first counterweight disposed in the first passage eccentric to first central and first eccentric axes, and apparatus connecting the first counterweight and first and second flywheels for joint rotation about the first central axis; and
- a second counterweight disposed in the second passage eccentric to second central and second eccentric axes, and apparatus connecting the second counterweight and the third and the fourth flywheels for joint rotation about the second central axis,
- first and second pinion shafts being disposed in timed relation such that first and second knife assemblies will be driven in opposite directions in a counterbalanced manner by the rotation of the first and second pinion shafts.

11. The compact epicyclical sickle drive of claim 10, wherein the apparatus connecting the first pinion shaft to the first knife assembly comprises elements configured and operable for translating the rotation of the first pinion shaft into reciprocating movements of the first knife assembly.

12. The compact epicyclical drive of claim 11, wherein the apparatus comprises a puck bearing assembly located externally of the first passage, carried on a knife arm of the first knife assembly, the knife arm being restrained for linear movements only parallel to the reciprocating movements of the first knife assembly, and the puck bearing assembly being connected to the first pinion shaft and restrained on the first knife assembly for eccentric rotation about the eccentric axis, for translating the rotation of the pinion shaft into reciprocating linear movements of the knife arm and the knife assembly.

13. The compact epicyclical sickle drive of claim 10, wherein the apparatus connecting the counterweights and the flywheels comprises pins extending therethrough and removable for allowing disassembly thereof.

14. The compact epicyclical sickle drive of claim 10, wherein the second flywheel and the fourth flywheel are supported for rotation in sealed relation to the second ends of the first and second passages, respectively, by sealed bearings.

15. The compact epicyclical sickle drive of claim 10, wherein the housing is configured to be mounted in or beneath a floor of a header of an agricultural harvesting machine with the sickle knife assemblies extending along an edge of the floor.

16. A epicyclical sickle drive mechanism, comprising:
- a generally flat, horizontally oriented housing including a first passage therethrough and a second passage therethrough beside the first passage;
- a first compact epicyclical drive comprising a first ring gear extending about the first passage defining a first central axis therethrough, the first ring gear being disposed between a first axial end of the first passage and an opposite second axial end thereof;
- a generally flat, disk shaped first flywheel supported by the housing adjacent to the first axial end of the first passage for rotation about the first central axis;
- a generally flat, disk shaped second flywheel supported by the housing in covering relation to the second axial end of the first passage for rotation about the first central axis in coaxial relation to the first flywheel;
- a first pinion shaft supported in the first passage by the first flywheel and the second flywheel eccentric to the first central axis for rotation about a first eccentric axis parallel to the first central axis, the first pinion shaft carrying a first pinion gear enmeshed with the first ring gear, and generally flat apparatus connecting the first pinion shaft in reciprocatingly driving relation to a first knife assembly of a sickle; and
- a first counterweight disposed in the first passage eccentric to the first central axis and the first eccentric axis, and apparatus connecting the first counterweight and the first and second flywheels for joint rotation about the first central axis for counterbalancing eccentric loads generated by rotation of the first pinion shaft and the first pinion gear;
- a second compact epicyclical drive comprising a second ring gear extending about the second passage defining a second central axis therethrough, the second ring gear being disposed between a first axial end of the second passage and an opposite second axial end thereof;
- a generally flat, disk shaped third flywheel supported by the housing adjacent to the first axial end of the second passage for rotation about the second central axis;
- a generally flat, disk shaped fourth flywheel supported by the housing in covering relation to the second axial end of the second passage for rotation about the second central axis in coaxial relation to the third flywheel;
- a second pinion shaft supported in the second passage by the third flywheel and the fourth flywheel eccentric to the second central axis for rotation about a second eccentric axis parallel to the second central axis, the second pinion shaft carrying a second pinion gear enmeshed with the second ring gear, and generally flat apparatus connecting the second pinion shaft in reciprocatingly driving relation to a second knife assembly of the sickle;

a second counterweight disposed in the second passage eccentric to the second central axis and the second eccentric axis, and apparatus connecting the second counterweight and the third and the fourth flywheels for joint rotation about the second central axis for counterbalancing eccentric loads generated by rotation of the second pinion shaft and the second pinion gear; and the pinion shafts being disposed in timed relation such that the knife assemblies will be driven in opposite directions in a counterbalanced manner by the rotation of the pinion shafts.

17. The sickle drive mechanism of claim 16, further comprising a bevel gear drive element connected in timed driving relation to the flywheels.

18. The sickle drive mechanism of claim 16, wherein the housing is configured to be mounted in or beneath a floor of a header of an agricultural harvesting machine with the sickle knife assemblies extending along an edge of the floor.

* * * * *